United States Patent Office 3,316,019
Patented Apr. 25, 1967

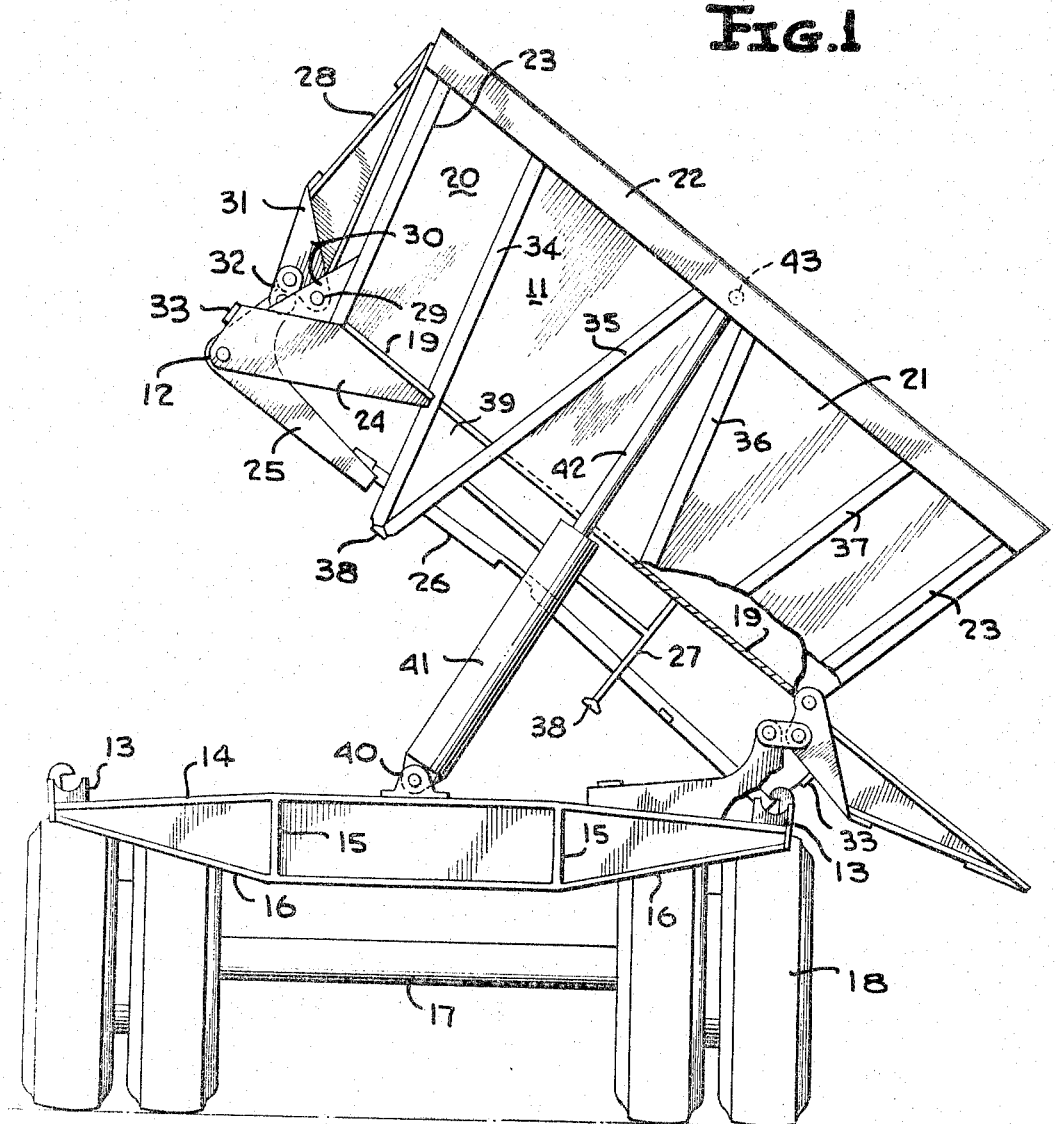

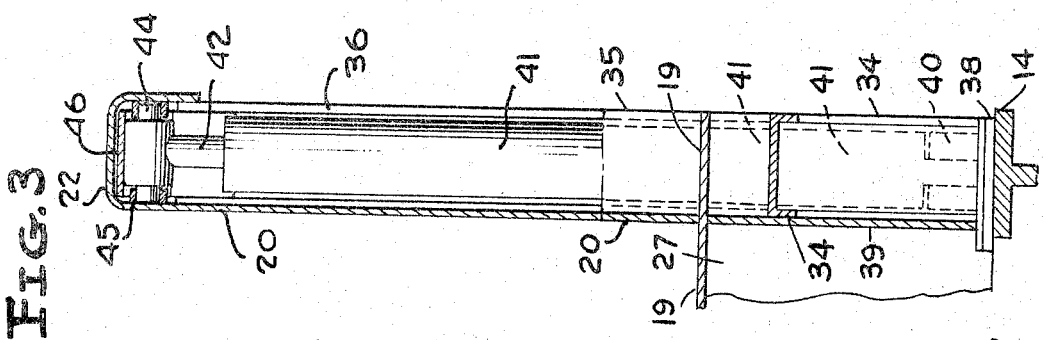
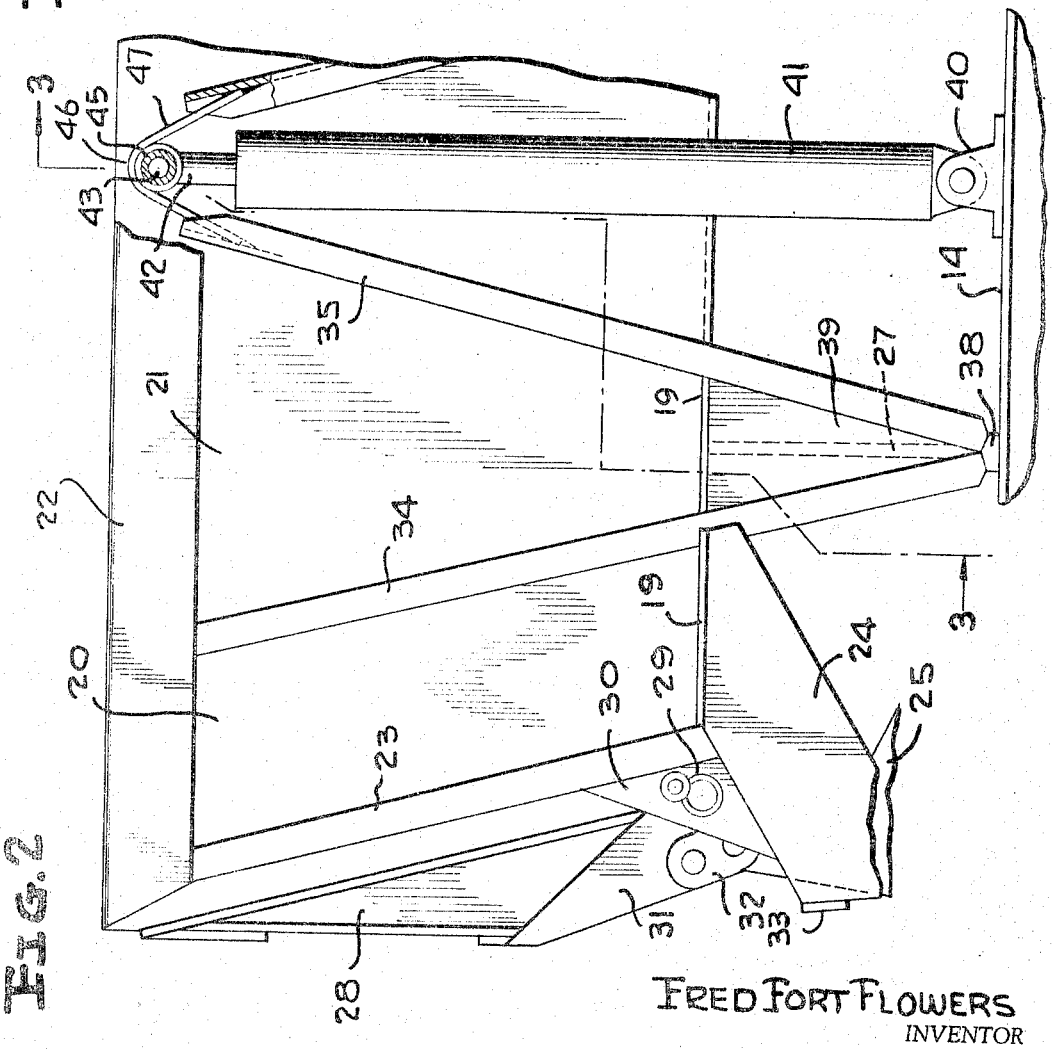

3,316,019
LATERALLY TILTABLE DUMP VEHICLE
Fred Fort Flowers, P.O. Box 238,
Findlay, Ohio 45840
Filed Mar. 29, 1965, Ser. No. 443,244
9 Claims. (Cl. 298—17.6)

The following specification relates to improvements in a laterally tiltable dump vehicle adapted for use on roads and open terrain as well as for rail transportation.

The improved construction is of the class of side dumping vehicles in which the vehicle sides are pivoted at the bottom and can be selectively down-turned or tilted, so that the load is discharged selectively beside the roadway. The improvement includes provision for rigid support of the fixed ends of the vehicle and simplified hoisting means at each end of the vehicle capable of tilting the vehicle body in either side direction.

One object of the invention is to design a rigid vehicle body of adequate strength to withstand the hoisting forces required to tilt the wagon body and its load in either side direction.

Another object of the invention is to arrange the reinforcing means for the rigid ends with adequate clearance beyond the angles of movement by the hoisting means.

A further object of the invention is to locate the hoisting means protected from falling objects and at the same time provide accessibility for easy inspection and maintenance.

A still further object of the invention is to provide a simple inexpensive and light weight hoisting means operating with a single stroke in contrast to heavy multi-stroke telescoping hoists.

Among the objects of the invention is to provide a construction readily fabricated by welding and the like from standard roll or extruded metal plates and shapes.

A still further object of the invention is to provide a hoisting arrangement which will permit the lowest over-all height for the combined dump body and hoist.

Incidentally the novel construction is advantageous due to the reduced number of parts used to withstand both hoist forces and other forces imposed by the weight of the load in the body and the pulling and pushing forces when the vehicle is hitched as a part of a convoy or train.

The preferred form of the invention has been illustrated for example in the accompanying drawings in which:

FIGURE 1 is an end elevation partly in section, of a side dump vehicle in discharge position;

FIGURE 2 is an enlarged fragmentary end elevation partly in section of the same in lowered position and FIGURE 3 is a vertical section of the hoisting means on the line 3—3 of FIGURE 2.

In brief, the improvement in the invention resides in the location of simple, single stroke hoisting cylinders at the opposite ends of the side discharge dump vehicle. The operation of the hoist is improved by providing means on the rigid ends of the body so that the hoisting force is transmitted uniformly through the ends of the body to support side sills.

In the drawing there is provided a wagon body 11. This is supported by trunnions 12, 12 on opposite sides resting removably on trunnion supports 13, 13. The supports in turn rest upon opposite sides of the underframe 14 of the wheeled vehicle. For this purpose the wheeled vehicle includes side sills 15, 15 and laterally extended bolsters 16, 16. The bolsters are supported resiliently on truck axles 17 by well known means not shown. The axles 17 carry pairs of wheels 18 for use either on roadway or railroad track.

Each end of the construction is the same so that one end only is shown and described. At opposite ends the underframe carries transverse bolsters 16 for supporting the wagon body 11. Opposite ends of the underframe 14 are provided in the known manner with draft means and trailer hitches.

The wagon body is constructed of stock forms of sheet metal, plates, bars and similar shapes welded into permanent attachment and forming a rigid construction. The body includes floor plate means 19 on which the fixed car ends 20 rest, each said end including an inner wall 21 having a down-turned channel 22 at the top, and said floor means extending beyond the end walls 21 at portions thereof as hereinafter described. See FIGURES 1, 2 and 3.

Along the outer side edges the wall 20 has a welded beam 23 which extends parallel to the outer side edges. Spaced pairs of diagonal plates 24 extend from and are secured beneath extended end portions of the floor plate means 19 as shown in FIGURES 1 and 2. These plates 24 carry the trunnions 12, 12 for bell crank levers 25. The bell crank levers 25 on the opposite sides are connected by a lock arm 26. This lock arm slides laterally in the side sills 27 depending from the floor plate means 19. By means of the lock arm 26 the wagon body is held trunnioned on the selected side for discharge, while the opposite side door is held closed in known manner.

Each side door 28 is hinged as at 29 to a pair of plates 30.

Each door 28 carries a bracket 31 which is connected by link 32 to the free end of the bell crank lever means 25.

The outward movement of the down-turning door is limited by a stop 33 connecting the ends of the pairs of plates 24, as shown at the right in FIGURE 1.

Inwardly of the end ribs 23 and on opposite sides of the center line, each rigid end 21 is provided with pairs of welded ribs designated 34, 35, 36, 37. The ribs 34, 35 are inclined so as to converge at the bottom of the flanged side sill 27, as clearly illustrated in FIGURES 1 and 2. The ribs 36, 37 are similarly placed, and at their lower ends the rib means rest on and are attached to a flange 38 on the sill means 27.

As before stated, the floor plate means 19 is extended beyond the inner wall 21 of the respective end units, not only at the locations of the pairs of plates 24 as shown at the left in FIGURES 1 and 2, but also between the pairs of downwardly converging rib sets 34, 35 and 36, 37 as shown in FIGURE 3. Web plate means 39 are attached to the end of each sill portion 27, to the bottom of the respective endwise extended portion of the floor between the rib sets 34, 35 and 36, 37 and to the opposing ribs of each said rib set. See FIGURE 3. One or more such web plate means may be employed and the flange 38 of each sill end portion is extended into position for receiving the lower ends of the ribs 34, 35 and 36, 37. It will be apparent that said ribs are in this manner very rigidly supported where they extend below the floor level.

In the horizontal position of the wagon body as shown in FIGURE 2, the flange 38 rests upon the upper surface of the underframe 14.

At its center the underframe 14 supports a bearing 40 forming a pivot for a pressure cylinder 41. This pressure cylinder is comparatively long and as shown in FIGURE 2, extends to a point near the top of the wagon body. The pressure cylinder contains a piston 42. This has consequently a relatively long stroke permitting the full tilting of the wagon body to a discharge position as shown in FIGURE 1.

The top of the piston 42 has a pivot pin 43. This pivot pin has bearing at 44 in bosses 45 which are welded in the inverted channel 22 forming the top edge of the wagon body end wall 20 in position as clearly illustrated in FIGURES 2 and 3.

An inverted stirrup 47 has its ends welded within the ribs 35 and 36 as shown on FIGURE 2 and includes a right portion 46 closely overlying the upper end extremity of the piston 42 as clearly shown in FIGURES 2 and 3. This reinforced the bushings 44 for the pivot end 43.

By the central location of the pressure cylinder 41 and the angular extent of the piston 42 as indicated in FIGURE 1, it will be seen that adequate clearance is provided by the ribs 35 and 36 to permit tilting of the body to the extreme discharge positions.

The improved construction above described permits a vehicle to be dumped selectively in either lateral direction. In doing so, the dump body is anchored on the side from which it is discharged. The means for tilting the body is located solely at the ends of the vehicle and along the longitudinal axis. This means operates in either lateral direction, thus reducing the need to a single operating mechanism.

As an incident of the invention, the ends of the body are reinforced so that they are rigid but are not extended beyond the position and range of movement of the hoisting means. The improved vehicle can be constructed of stock material of relatively light weight due to the type of reinforcement. Numerous changes in minor details of material, construction and design, are possible within the scope of the invention as defined in the following claims.

What I claim is:

1. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, and a pair of ribs attached to each side of the body ends, connected to and extending below the floor plate means at respective side and having their lower ends meeting and resting on the underframe.

2. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of spaced sills having flanged lower end portions beneath the floor plate means, a vertical web plate attached to the floor plate means and to an end portion of each sill, and a pair of downwardly converging ribs attached to each side of the body ends and the web plate and resting on the flanges of the sills.

3. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of spaced flanged sills beneath the floor plate means, a pair of inclined ribs attached to each side of each body end and to one of said sills disposed intermediately thereof and a triangular web plate rigidly connecting each sill with the floor plate means and with the lower ends of the adjacent pair of inclined ribs.

4. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of downwardly diverging ribs attached to the outer sides of each body end and to said floor plate means, a central bearing between the upper ends of the ribs, a pressure cylinder pivotally journaled centrally of each end of the underframe and a piston in each cylinder connected to a central bearing.

5. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of downwardly diverging ribs attached to the outer sides of each body end and to said floor plate means, an inverted stirrup held between the upper ends of the ribs, a central bearing within the stirrup, a pressure cylinder pivotally journaled centrally of each end of the underframe and a piston in each cylinder connected to a central bearing.

6. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of downwardly diverging ribs attached to the outer sides of each body end and to said floor plate means, reinforcing ribs attached to each side of each body end and inclined upwardly and outwardly from the bottom ends of the first mentioned ribs, a central bearing between the upper ends of the first mentioned ribs, a pressure cylinder pivotally journaled centrally of each end of the underframe and a piston in each cylinder connected to a central bearing.

7. In combination with the underframe of a vehicle having trunnion bearings on each side, a dump body having trunnions removably carried in said bearings, down-turning side doors pivotally mounted on the body, fixed ends for the body, floor plate means on the body and extending beyond each end, a pair of spaced flanged sills beneath the floor plate means, a pair of downwardly diverging ribs attached to said floor plate means and centrally at the top to endwise directed portions of each body end and each to one said sill, a pressure cylinder pivotally journaled centrally to each end of the underframe at the top and a piston in each cylinder connected to a central bearing, the ribs being inclined downwardly and outwardly toward the bottom outside the limit of movement of the pistons.

8. In combination with the underframe of a vehicle having trunnion bearings on each side, a dump body having trunnions removably carried in said bearings, down-turning side doors pivotally mounted on the body, fixed ends for the body, floor plate means on the body, a pair of spaced flanged sills beneath the floor plate means, a pair of inclined ribs attached to each outer side of each body end and to one of said sills disposed intermediately thereof and a triangular web plate rigidly connecting each sill with the floor plate means and with the lower ends of the adjacent pair of inclined ribs.

9. In combination with the underframe of a vehicle having trunnion bearings on each side, a dump body having trunnions removably carried in said bearings, down-turning side doors pivotally mounted on the body, fixed ends for the body, floor plate means on the body, a pair of spaced flanged sills beneath the floor plate means, a pair of downwardly diverging ribs attached centrally at the top to endwise directed portions of each body end each and to one said sill and to said floor plate means, a pressure cylinder pivotally journalled centrally to each end of the underframe and a piston in each cylinder connected to a central bearing means secured at an upper portion of the adjacent body end, the ribs being inclined downwardly and outwardly to extend below the level of the floor plate means and be disposed outside the limit of movement of the pistons.

References Cited by the Examiner

UNITED STATES PATENTS

| | | | |
|---|---|---|---|
| 1,679,547 | 8/1928 | Schmohl | 105—276 |
| 2,072,998 | 3/1937 | Allin | 298—17.6 |
| 2,194,068 | 3/1940 | Eisenberg | 298—17.6 |
| 2,360,456 | 10/1944 | Weierbach | 298—17.6 |
| 3,101,974 | 8/1963 | Robertson | 298—17.6 |

BENJAMIN HERSH, *Primary Examiner.*

R. J. JOHNSON, *Assistant Examiner.*